US012575012B2

(12) United States Patent
Tan et al.

(10) Patent No.: US 12,575,012 B2
(45) Date of Patent: Mar. 10, 2026

(54) DIMMING CONTROL CIRCUIT COMPATIBLE WITH EMERGENCY LIGHTING AND METHOD

(71) Applicant: Dongguan Haiyue Intelligent Technology Co., Ltd, Guangdong (CN)

(72) Inventors: Huishi Tan, Guangdong (CN); Tengfei Zhou, Guangdong (CN)

(73) Assignee: Dongguan Haiyue Intelligent Technology Co., Ltd, Dongguan (CN)

( * ) Notice: Subject to any disclaimer, the term of this patent is extended or adjusted under 35 U.S.C. 154(b) by 213 days.

(21) Appl. No.: 18/527,386

(22) Filed: Dec. 4, 2023

(65) Prior Publication Data

US 2025/0024575 A1 Jan. 16, 2025

(30) Foreign Application Priority Data

Jul. 14, 2023 (CN) ......................... 202310872235.9

(51) Int. Cl.
*H05B 47/17* (2020.01)
*H05B 45/325* (2020.01)
*H05B 47/165* (2020.01)

(52) U.S. Cl.
CPC ......... *H05B 47/172* (2024.01); *H05B 45/325* (2020.01); *H05B 47/165* (2020.01)

(58) Field of Classification Search
CPC .. H05B 47/172; H05B 45/325; H05B 47/165; H05B 45/10; H05B 45/50; H05B 47/105; H05B 47/17; H05B 47/20; F21V 23/0435; F21V 23/0442
See application file for complete search history.

(56) References Cited

U.S. PATENT DOCUMENTS

| | | | | |
|---|---|---|---|---|
| 11,523,488 B1 * | 12/2022 | Recker | .................. | H05B 45/56 |
| 2014/0097758 A1 * | 4/2014 | Recker | .................. | H05B 47/19 315/297 |

FOREIGN PATENT DOCUMENTS

| | | | | |
|---|---|---|---|---|
| CN | 104981656 A | * 10/2015 | ............. | H05B 47/11 |
| CN | 106063377 A | * 10/2016 | ......... | H05B 47/1965 |
| CN | 116209116 A | * 6/2023 | ........... | H05B 45/325 |
| EP | 3886536 A2 | * 9/2021 | ............. | H05B 47/19 |

* cited by examiner

*Primary Examiner* — Abdullah A Riyami
*Assistant Examiner* — Syed M Kaiser
(74) *Attorney, Agent, or Firm* — Nitin Kaushik

(57) ABSTRACT

Disclosed is a dimming control circuit compatible with emergency lighting, and a method. The dimming control circuit includes a main control circuit; a first port circuit, where an input terminal of the first port circuit is electrically connected to an external automatic dimming circuit, and an output terminal of the first port circuit is electrically connected to a corresponding input terminal of the main control circuit; and a second port circuit.

9 Claims, 6 Drawing Sheets

DIMMING CONTROL CIRCUIT COMPATIBLE WITH EMERGENCY LIGHTING AND METHOD

CROSS-REFERENCE TO RELATED APPLICATION

The present application claims priority from Chinese Patent Application No. 202310872235.9 filed on Jul. 14, 2023, the contents of which are incorporated herein by reference in their entirety.

FIELD OF TECHNOLOGY

The present disclosure relates to the technical field of emergency lighting, and in particular to a dimming control circuit compatible with emergency lighting and a method.

BACKGROUND

Emergency lighting is an important safety facility in modern public buildings and industrial buildings, which is closely related to personal safety and building safety. When there is a fire or other disaster in the buildings and the power supply is interrupted, emergency lighting plays an important role in personnel evacuation, fire rescue work, the continuous operation of important production and work or necessary operation and disposal.

At present, the emergency lighting system composed of emergency power supply and lamps is connected to dimming devices such as a wall switch, a timing switch and a human motion sensor. It is hoped that lamp can provide necessary lighting in the period of time with lighting demand according to the needs of people, and keep low brightness or go out at other times, so as to achieve energy saving and compatibility with lamp utilization and emergency.

Under normal mains supply, the addition of above devices can really achieve the desired effect. During active hours of people, the lamp can provide effective lighting. In a case of not requiring the lighting, the lamp can be turned off or half-lit to achieve the effect of saving power resources.

However, when the lamp without mains supply needs to provide emergency lighting, the emergency power supply starts to actively provide power to the lamp and adjust the lamp power to achieve the target emergency power. At this time, it is unknown for the dimming device connected to the lamp (e.g., wall dimming, timing dimming, motion sensing, etc.) that the emergency should take precedence at this time, and thus the dimming device will compete with emergency dimming for the control of the lamp. After a period of competition, the emergency power supply detects abnormal load, and may cut off the power supply to the lamp according to the internal setting of priority protection equipment, making the emergency lighting system unable to operate normally. The biggest duty of a fully functional emergency lighting system should be to provide emergency lighting. In this case, the emergency lighting system loses its most important emergency function.

SUMMARY

For the problems in the prior art, a dimming control circuit compatible with emergency lighting is provided.

To achieve the objective above, the technical solution adopted by the present disclosure is as follows:

A dimming control circuit compatible with emergency lighting includes:

a main control circuit;

a first port circuit, where an input terminal of the first port circuit is electrically connected to an external automatic dimming circuit, and an output terminal of the first port circuit is electrically connected to a corresponding input terminal of the main control circuit;

a second port circuit, where an input terminal of the second port circuit is electrically connected to an external emergency power supply, and a corresponding output terminal of the second port circuit is electrically connected to a corresponding input terminal of the main control circuit; and a lighting port circuit, where a corresponding input terminal of the lighting port circuit is electrically connected to a corresponding output terminal of the main control circuit, and an output terminal of the lighting port circuit is connected to an external lamp.

When the first port circuit identifies that the automatic dimming circuit inputs a (pulse width modulation) PWM signal or a 0-10 V signal and the second port circuit identifies that an emergency power supply signal is input, the main control circuit is configured to identify the PWM signal and the emergency power supply signal, respectively, preferably the emergency power supply signal. When identifying that the emergency power supply signal is a non-emergency power supply signal, the main control circuit is configured to perform input capture on the PWM signal to acquire an amplitude, a duty ratio and a cycle, to collect an effective voltage of the 0-10 V signal, and to output information to the lighting port circuit after recovery calculation. The lighting port circuit is configured to output a voltage signal to control brightness of the lamp.

Alternatively, the main control circuit includes a CMS8S6990 chip and a peripheral circuit of the CMS8S6990 chip.

Alternatively, the first port circuit includes a port D1, a resistor R6, a resistor R7, and a capacitor C4. A first terminal of the port D1 is connected to a 12 V direct current (DC) voltage, a second terminal of the port D1 is connected to one terminal of the resistor R6, the other terminal of the resistor R6 is connected to one terminal of the resistor R7 and one terminal of the capacitor C4, respectively, and connected to a corresponding input terminal of the CMS8S6990 chip. The other terminal of the resistor R7 and the other terminal of the capacitor C4 are grounded, and are connected to a third terminal of the port D1; and the first terminal, the second terminal and the third terminal of the port D1 are also connected to the external automatic dimming circuit.

Alternatively, the second port circuit includes a port D3, a resistor R9, a resistor R8, and a capacitor C6. A first terminal D3-D4-DIM+ of the port D3 is connected to a corresponding analog-to-digital converter (ADC) input terminal of the CMS8S6990 chip via one terminal of the resistor R9, one terminal of the resistor R8 and one terminal of the capacitor C6, and a second terminal D3-D4-DIM− of the port D3 is connected to the other terminal of the resistor R9 and the other terminal of the capacitor and is grounded. The first terminal D3-D4-DIM+ and the second terminal D3-D4-DIM− of the port D3 are both emergency power supply dimming wires and are connected to the external emergency power supply.

Alternatively, the lighting port circuit includes a resistor R10, a resistor R12, a resistor R11, a capacitor C7, and a proportional amplifier circuit. One terminal of the resistor R10 is connected to a corresponding output terminal of the CMS8S6990 chip, and the other terminal of the resistor R10 is connected to one terminal of the resistor R12 and one terminal of the resistor R11, respectively. The resistor R11 is connected to one terminal of the capacitor C7 and is further connected to an input terminal of the proportional amplifier circuit, the other terminal of the resistor R12 and the other terminal of the capacitor C7 are both grounded, and an output terminal of the proportional amplifier circuit is connected to a lamp.

Alternatively, the proportional amplifier circuit includes an operational amplifier, a capacitor C8, a resistor R13, a resistor R14, a resistor R15, a capacitor C9, a resistor R18, a capacitor C10, a resistor R17, a resistor R16, and a triode Q1. An inverting input terminal of the operational amplifier is connected to one terminal of the resistor R11, an in-phase terminal of the operational amplifier is connected to an inverting terminal via the capacitor C8, an output terminal of the operational amplifier is configured for output via the resistor R18, an inverting terminal of the operational amplifier is connected to one terminal of the resistor R18 via the resistor R15 and the capacitor C9, and is connected to a base of the triode Q1. The in-phase terminal of the operational amplifier is also connected to one terminal of the resistor R13 and is respectively connected to one terminal of the resistor R16 and one terminal of the resistor R17 via the resistor R14, and is connected to a collector of the triode Q1. The collector of the triode Q1 is also connected to a control terminal of the lamp, and an emitter of the triode Q1 is grounded. The other terminal of the resistor R13 is grounded, the other terminal of the resistor R16 is connected to the 12 V DC, and the other terminal of the resistor R17 is connected to one terminal of the resistor R18 via the capacitor C10.

Alternatively, the dimming control circuit further includes a power adjustment circuit. The power adjustment circuit includes a dual in-line package (DIP) switch, a resistor R2, a resistor R3, a resistor R4, and a resistor R5. One terminal of the resistor R2, one terminal of the resistor R3, one terminal of the resistor R4 and one terminal of the resistor R5 are connected to corresponding output terminals of the DIP switch, respectively. The other terminal of the resistor R2, the other terminal of the resistor R3, the other terminal of the resistor R4 and the other terminal of the resistor R5 are connected to corresponding input terminals of the CMS8S6990 chip, respectively, and input terminals of the DIP switch are all grounded.

The power adjustment circuit further includes a slide rheostat R1 and a capacitor C3. A first terminal of the rheostat R1 is connected to the 12 V DC, a second terminal of the slide rheostat R1 is grounded, a third terminal of the slide rheostat R1 is connected to a corresponding input terminal of the CMS8S6990 chip, and the capacitor C3 is connected between the third terminal and the second terminal of the slide rheostat R1 in parallel.

A method for a dimming control circuit compatible with emergency lighting includes the following steps:

when reading that an automatic dimming circuit inputs a non-PWM signal, dividing, by a first port circuit, a voltage via a resistor R6 and a resistor R7, and filtering the divided voltage via the resistor R7 and a capacitor C4, and then outputting the filtered voltage to a CMS8S6990 chip, reading, by an ADC terminal of the CMS8S6990 chip, a change of an analog voltage and converting the change of the analog voltage into a digital signal, recording, by the CMS8S6990 chip, the read voltage digital signal as D1V, multiplying D1V by n through internal calculation to amplify the D1V by n times, thus restoring the D1V to an original signal;

when an input of each of a first terminal D3-D4-DIM+ and a second terminal D3-D4-DIM− of a second port circuit is an input of an analog voltage of 0-10 V or a particular code value is input to the CMS8S6990 chip, determining, by the CMS8S6990 chip, a mode after decoding the input, if the mode is a non-emergency mode, dividing the analog voltage of 0-10 V via a resistor R9 and a resistor R8, and filtering the divided voltage by the resistor R8 and a capacitor C6 to obtain an analog voltage signal of 0-5 V or 0-3.3 V, reading, by the ADC of the CMS8S6990 chip, a real-time voltage, and calculating an original signal voltage, and setting the original signal voltage to be D3V;

achieving, by a power adjustment circuit, n-th power of 2 adjustments of the maximum power in a non-emergency state through a DIP switch, setting a general purpose input/output (GPIO) port of the CMS8S6990 chip to be 0 V or a voltage common collector (VCC) through the DIP switch, so as to achieve the identification of 0 and 1, obtaining a plurality of gears through a binary combination of multi-bit 0 and 1, or achieving the maximum power adjustment through a slide rheostat R1, and reading, by the CMS8S6990 chip, a proportion in real time through a level and the ADC, and setting the proportion to be P; and monitoring, by the CMS8S6990 chip, data of each port circuit in real time, multiplying a parameter of a D1 voltage of the first port circuit by P to obtain D1V*P=D5V, thus ensuring that a lamp is able to normally output correct brightness in the non-emergency mode, wherein D5V is an output terminal voltage of a lighting port circuit to the lamp.

Alternatively, when the CMS8S6990 chip determines that the mode is an emergency mode after decoding, a D3V voltage is input by the CMS8S6990 chip to an input terminal of the lighting port circuit, that is, D5V=D3V.

Alternatively, when the input terminal of the lighting port circuit receives a voltage that D1V*P=D5V or D5V=D3V, the voltage is divided via a resistor R10 and a resistor R12 to obtain a voltage equal to PWM high-level voltage*R12/(R10+R12), then the voltage equal to PWM high-level voltage*R12/(R10+R12) is input to an inverting input terminal of an operational amplifier via a low-pass filter composed of a resistor R11 and a capacitor C7, an amplifying factor of the operational amplifier is A=R14/R13+1. Meanwhile, an output of the operational amplifier is configured to control a base of a triode Q1 to operate in a linear amplifying area, feedback of the operational amplifier is connected to a collector of a triode Q; a change of a collector voltage is directly fed back to an in-phase input terminal of the operational amplifier when sampled, the larger the triode Q is turned on, the lower a feedback terminal voltage is, thus forming negative feedback. A feedback signal and an input signal are configured to control a base of the transistor Q to change an internal resistance of the transistor Q and change the collector voltage, thus remaining the collector voltage unchanged, so as to achieve a PWM signal with a given duty ratio and to output a 0-10 V signal with a corresponding proportion.

By adopting the technical solution, the present disclosure has the following beneficial effects:

Voltage signals of a first port circuit, a second port circuit and a power adjustment circuit can be detected through a CMS8S6990 chip in emergency and non-emergency modes for corresponding mode determination, so as to control an output of a lighting port circuit. A lamp is only controlled only by D5V at the same time, and an output of D5V only comes from a signal of DV3 or DV1*P at the same time, thus avoiding the problem that the emergency power supply cannot respond to an emergency due to detection error caused by competing for control with the external automatic dimming circuit in emergency mode. Therefore, the emergency power supply and other dimming circuits can share the same lamp to achieve the perfect compatibility between lighting and emergency, and the problem of incompatibility between emergency power supply, lamp and automatic dimming equipment is avoided.

DESCRIPTION OF THE EMBODIMENTS

Figure 1:
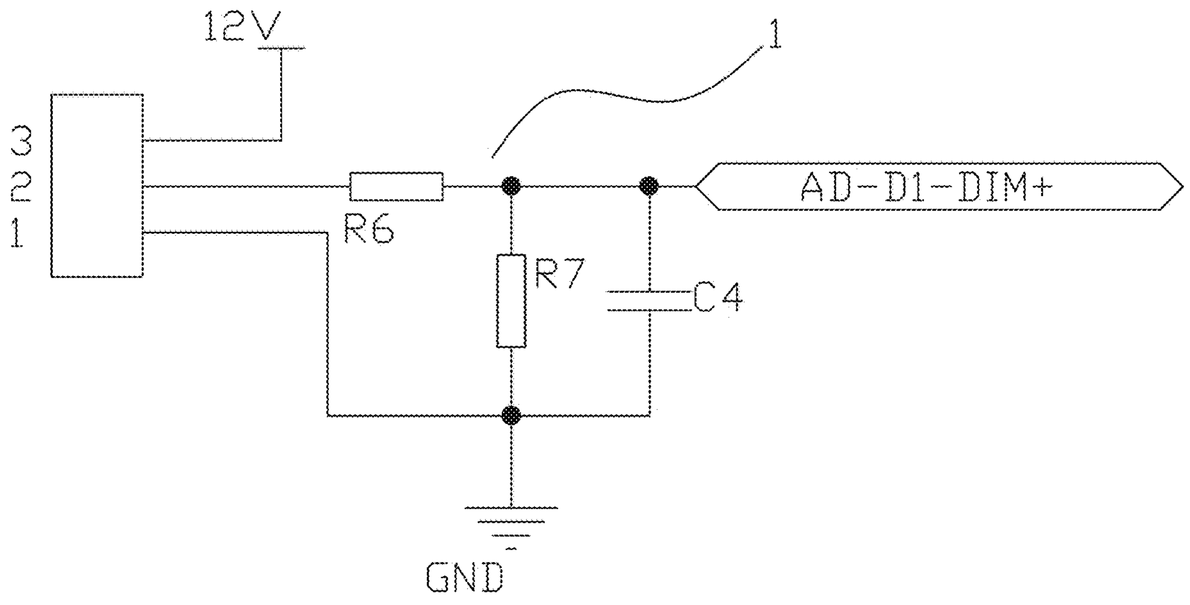
FIG. 1 is a schematic circuit diagram of a first port circuit according to the present disclosure.

The embodiments of the present disclosure are described in detail below. Examples of the embodiments are shown in the accompanying drawings, and the same or similar numbers throughout this specification represent the same or similar elements or elements having the same or similar functions. The embodiments described below in conjunction with the drawings are illustrative, and are intended to illustrate the present disclosure, and cannot be construed as the limitations of the present disclosure.

In the description of the present disclosure, it needs to be understood that the orientation or positional relationship indicated by terms "center", "longitudinal", "transverse", "length", "width", "thickness", "upper", "lower", "front", "back", "left", "right", "vertical", "horizontal", "top", "bottom", "inside", "outside", "clockwise" and "counterclockwise" is based on the orientation or positional relationship shown in the drawings only for convenience of description of the present disclosure and simplification of description rather than indicating or implying that the device or element referred to must have a particular orientation, be constructed and operate in a particular orientation, and thus are not to be construed as limiting the present disclosure.

Furthermore, the terms "first" and "second" are used for descriptive purposes only and are not to be construed as indicating or implying relative importance or implying the number of the indicated technical features. Thus, the feature defined by "first" and "second" can explicitly or implicitly include one or more features. In the description of the present disclosure, "a plurality of" means two or more, unless otherwise specifically defined.

In the present disclosure, unless expressly specified and limited otherwise, the terms "install", "connect", "couple", "fix", and the like should be understood broadly, e.g., may be either a fixed connection or a detachable connection, or a connection in one piece; may be a mechanical connection or an electrical connection; may be a direct connection or an indirect connection through an intermediate medium, may be an internal communication between the two elements or interactions between the two elements. The ordinary artisans concerned may understand the specific meaning of terms in this disclosure according to specific circumstance.

In the present disclosure, unless expressly specified and limited otherwise, a first feature "on" or "under" a second feature may refer to that the first feature is in direct contact with the second feature, and may refer to that the first feature is in indirect contact with the second feature by an intermediate medium. Moreover, the first feature is "above", "on" and "over" the second feature, including that the first feature is above and at an inclined top of the second feature, or only indicating that a horizontal height of the first feature is higher than that of the second feature. The first feature is "below", "under" and "beneath" the second feature, including that the first feature is below and at an inclined bottom of the second feature, or only indicating that a horizontal height of the first feature is lower than that of the second feature.

Referring to FIG. 1 through FIG. 4, a dimming control circuit compatible with emergency lighting is provided by the present disclosure, including:

- a main control circuit 3;
- a first port circuit 1, where an input terminal of the first port circuit 1 is electrically connected to an external automatic dimming circuit, and an output terminal of the first port circuit 1 is electrically connected to a corresponding input terminal of the main control circuit 3;
- a second port circuit 2, where an input terminal of the second port circuit 2 is electrically connected to an external emergency power supply, and a corresponding output terminal of the second port circuit 2 is electrically connected to a corresponding input terminal of the main control circuit 3; and
- a lighting port circuit 4, where a corresponding input terminal of the lighting port circuit 4 is electrically connected to a corresponding output terminal of the main control circuit 3, and an output terminal of the lighting port circuit 4 is connected to an external lamp.

When the first port circuit 1 identifies that the automatic dimming circuit inputs a PWM signal or a 0-10 V signal and the second port circuit 2 identifies that an emergency power supply signal is input, the main control circuit 3 is configured to identify the PWM signal and the emergency power supply signal, respectively, preferably the emergency power supply signal. When identifying that the emergency power supply signal is a non-emergency power supply signal, the main control circuit 3 is configured to perform input capture on the PWM signal to acquire an amplitude, a duty ratio and a cycle, to collect an effective voltage of the 0-10 V signal, and to output information to the lighting port circuit 4 after recovery calculation. The lighting port circuit 4 is configured to output a voltage signal to control brightness of the lamp.

Figure 3:
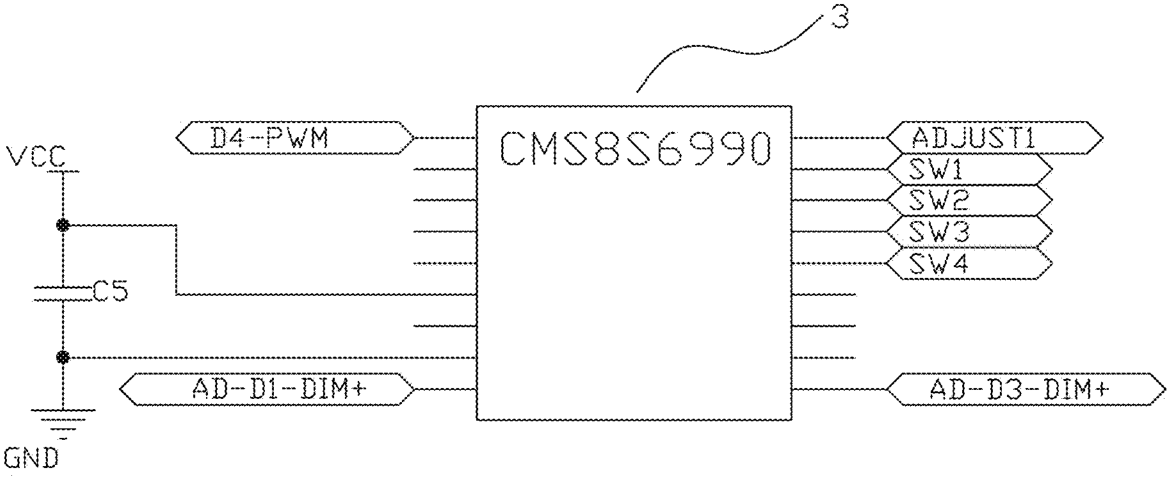
FIG. 3 is a schematic diagram of a main control circuit according to the present disclosure.

As shown in FIG. 3, in this embodiment, the main control circuit 3 includes a CMS8S6990 chip and a peripheral circuit of the CMS8S6990 chip.

Figure 6:
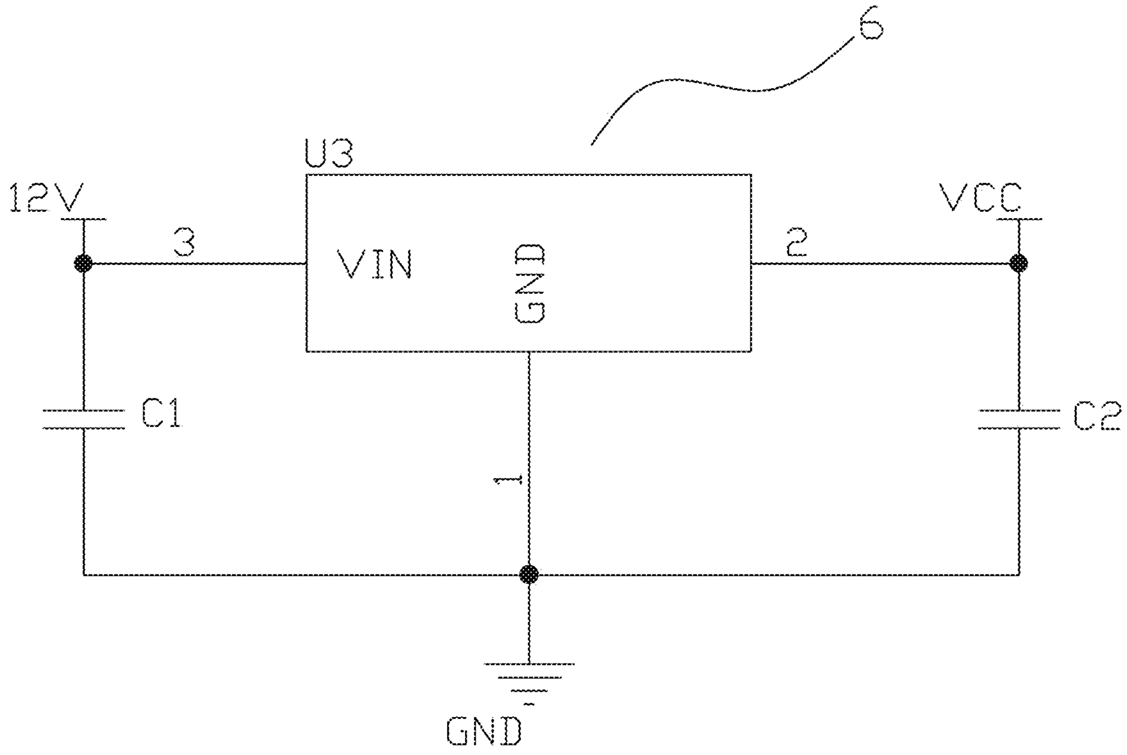
FIG. 6 is a schematic circuit diagram of a power supply circuit according to the present disclosure.

With reference to FIG. 6, specifically, the peripheral circuit further includes a power supply circuit 6. The power supply circuit 6 includes a power supply chip U3, a capacitor C1, and a capacitor C2. The capacitor C1 is connected to an input terminal of the power supply chip U3, the capacitor C2 is connected to an output terminal of the power supply chip U3, one input terminal of the power supply chip U3 is connected to a 12 V DC, the 12 V DC is reduced via the power supply chip U3 to output 3.3 V, so as to supply power to the CMS8S6990 chip.

With reference to FIG. 1, in this embodiment, the first port circuit 1 includes a port D1, a resistor R6, a resistor R7, and a capacitor C4. A first terminal of the port D1 is connected to a DC12 V voltage, a second terminal of the port D1 is connected to one terminal of the resistor R6, and the other terminal of the resistor R6 is connected to one terminal of the resistor R7 and one terminal of the capacitor C4, respectively, and is connected to a corresponding input terminal of the CMS8S6990 chip. The other terminal of the resistor R7 and the other terminal of the capacitor C4 are grounded, and are connected to a third terminal of the port D1. The first terminal, the second terminal and the third terminal of the port D1 are also connected to an external automatic dimming circuit, in which the port D1 is used to connect the external automatic dimming circuit.

Figure 2:
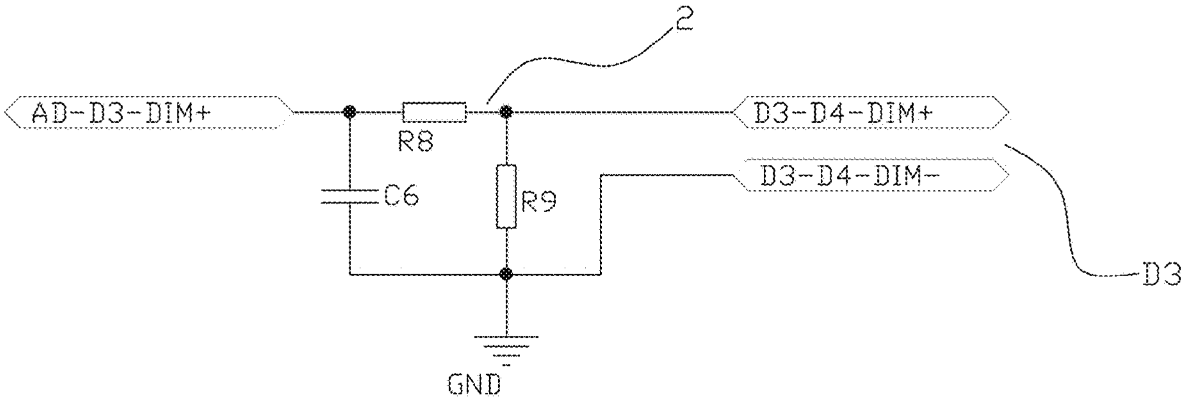
FIG. 2 is a schematic circuit diagram of a second port circuit according to the present disclosure.

As shown in FIG. 2, in this embodiment, the second port circuit 2 includes a port D3, a resistor R9, a resistor R8, and a capacitor C6. A first terminal D3-D4-DIM+ of the port D3 is connected to a corresponding ADC input terminal of the CMS8S6990 chip via one terminal of the resistor R9, one terminal of the resistor R8 and one terminal of the capacitor C6, and a second terminal D3-D4-DIM− of the port D3 is connected to the other terminal of the resistor R9 and the other terminal of the capacitor and is grounded. The first terminal D3-D4-DIM+ and the second terminal D3-D4-DIM− of the port D3 are both emergency power supply dimming wires and are connected to the external emergency power supply.

Figure 4:
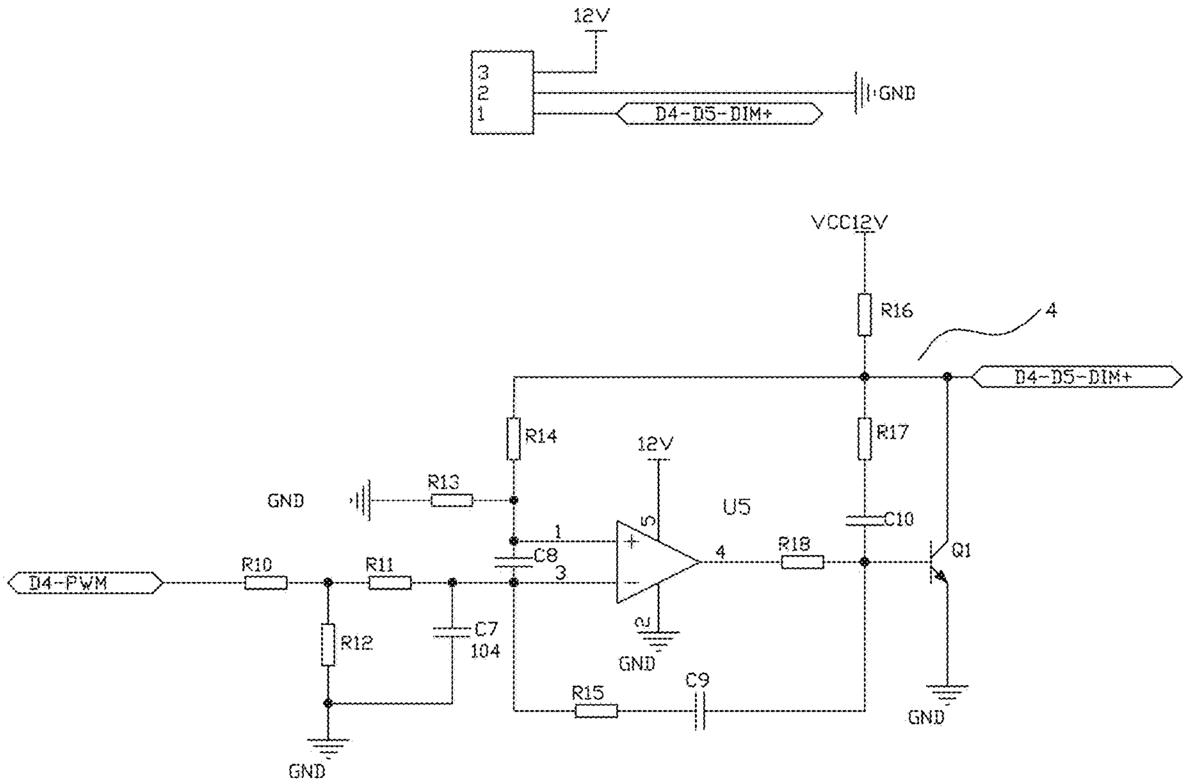
FIG. 4 is a schematic circuit diagram of a lighting port circuit according to the present disclosure.

As shown in FIG. 4, in this embodiment, the lighting port circuit 4 includes a resistor R10, a resistor R12, a resistor R11, a capacitor C7 and a proportional amplifier circuit. One terminal of the resistor R10 is connected to a corresponding output terminal of the CMS8S6990 chip, and the other terminal of the resistor R10 is connected to one terminal of the resistor R12 and one terminal of the resistor R11, respectively. The resistor R11 is connected to one terminal of the capacitor C7, and is also connected to an input terminal of the proportional amplifier. The other terminal of the resistor R12 and the other terminal of the capacitor C7 are grounded, and an output terminal of the proportional amplifier is connected to a lamp. The proportional amplifier circuit includes an operational amplifier, a capacitor C8, a resistor R13, a resistor R14, a resistor R15, a capacitor C9, a resistor R18, a capacitor C10, a resistor R17, a resistor R16, and a triode Q1. An inverting input terminal of the operational amplifier is connected to one terminal of the resistor R11, an in-phase terminal of the operational amplifier is connected to an inverting terminal via the capacitor C8, an output terminal of the operational amplifier is configured for output via the resistor R18, and an inverting terminal of the operational amplifier is also connected to one terminal of the resistor R18 via the resistor R15 and the capacitor C9, and is connected to a base of the triode Q1. The in-phase terminal of the operational amplifier is also connected to one terminal of the resistor R13 and is respectively connected to one terminal of the resistor R16 and one terminal of the resistor R17 via the resistor R14, and is connected to a collector of the triode Q1. The collector of the triode Q1 is also connected to a control terminal of the lamp, and an emitter of the triode Q1 is grounded. The other terminal of the resistor R13 is grounded, the other terminal of the resistor R16 is connected to DC12V, and the other terminal of the resistor R17 is connected to one terminal of the resistor R18 via the capacitor C10. A D4-D5-DIM+ output terminal as shown in FIG. 4 is configured to connect an external lamp.

Figure 5:
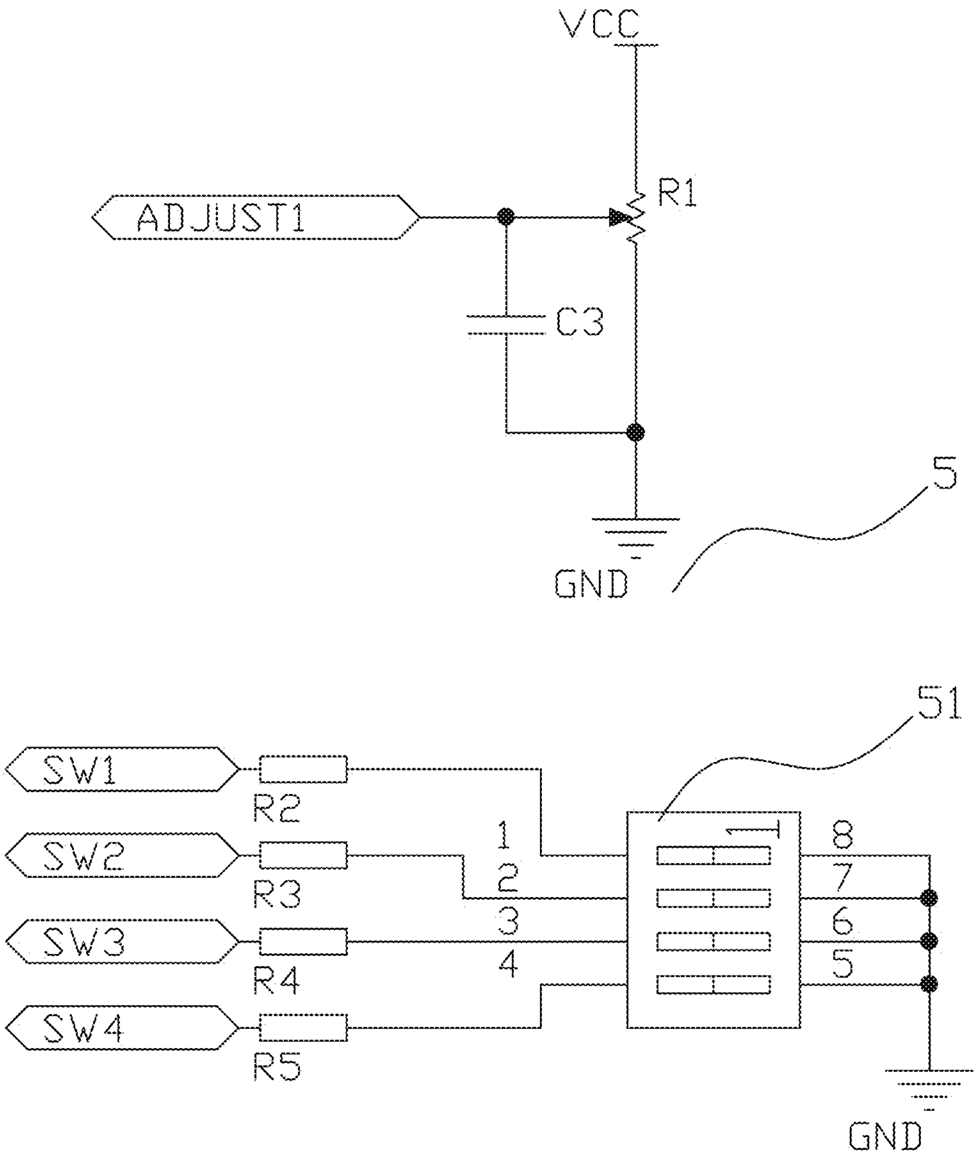
FIG. 5 is a schematic circuit diagram of a power adjustment circuit according to the present disclosure.

As shown in FIG. 5, in this embodiment, the dimming control circuit further includes a power adjustment circuit 5. The power adjustment circuit 5 includes a DIP switch 51, a resistor R2, a resistor R3, a resistor R4, and a resistor R5. One terminal of the resistor R2, one terminal of the resistor R3, one terminal of the resistor R4 and one terminal of the resistor R5 are connected to corresponding output terminals of the DIP switch, respectively. The other terminal of the resistor R2, the other terminal of the resistor R3, the other terminal of the resistor R4 and the other terminal of the resistor R5 are connected to corresponding input terminals of the CMS8S6990 chip, respectively. Input terminals of the DIP switch 51 are all grounded.

The power adjustment circuit 5 further includes a slide rheostat R1, and a capacitor C3. A first terminal of the rheostat R1 is connected to the 12 V DC, a second terminal of the slide rheostat R1 is grounded, a third terminal of the slide rheostat R1 is connected to a corresponding input terminal of the CMS8S6990 chip, and the capacitor C3 is connected between the third terminal and the second terminal of the slide rheostat R1 in parallel.

A method for a dimming control circuit compatible with emergency lighting includes the following steps:

- when reading that an automatic dimming circuit inputs a non-PWM signal, dividing, by a first port circuit 1, a voltage via a resistor R6 and a resistor R7, and filtering the divided voltage via the resistor R7 and a capacitor C4, and then outputting the filtered voltage to a CMS8S6990 chip, reading, by an ADC terminal of the CMS8S6990 chip, a change of an analog voltage and converting the change of the analog voltage into a digital signal, recording, by the CMS8S6990 chip, the read voltage digital signal as D1V, multiplying D1V by n through internal calculation to amplify the D1V by n times, thus restoring the D1V to an original signal;
- when an input of each of a first terminal D3-D4-DIM+ and a second terminal D3-D4-DIM− of a second port circuit 2 is an input of an analog voltage of 0-10 V or a particular code value is input to the CMS8S6990 chip, determining, by the CMS8S6990 chip, a mode after decoding the input, if the mode is a non-emergency mode, dividing the analog voltage of 0-10 V via a resistor R9 and a resistor R8, and filtering the divided voltage by the resistor R8 and a capacitor C6 to obtain an analog voltage signal of 0-5 V or 0-3.3 V, reading, by the ADC of the CMS8S6990 chip, a real-time voltage, and calculating an original signal voltage, and setting the original signal voltage to be D3V;
- achieving, by a power adjustment circuit 5, n-th power of 2 adjustments of the maximum power in a non-emergency state through a DIP switch 51, setting a GPIO port of the CMS8S6990 chip to be 0 V or VCC through the DIP switch, so as to achieve the identification of 0 and 1, obtaining multiple gears through a binary combination of multi-bit 0 and 1, or achieving the maximum power adjustment through a slide rheostat R1, and reading, by the CMS8S6990 chip, a proportion in real time through level and ADC, and setting the proportion to be P; and
- monitoring, by the CMS8S6990 chip, data of each port circuit in real time, multiplying a parameter of a D1 voltage of the first port circuit 1 by P to obtain D1V*P=D5V, thus ensuring that a lamp is able to normally output correct brightness in the non-emergency mode, where D5V is an output terminal voltage of a lighting port circuit to the lamp.

In this embodiment, when the CMS8S6990 chip determines that the mode is an emergency mode after decoding, a D3V voltage is input by the CMS8S6990 chip to an input terminal of the lighting port circuit 4, i.e., D5V=D3V.

In this embodiment, when the input terminal of the lighting port circuit 4 receives a voltage that D1V*P=D5V or D5V=D3V, the voltage is divided via a resistor R10 and a resistor R12 to obtain a voltage equal to PWM high-level voltage*R12/(R10+R12), then the voltage equal to PWM high-level voltage*R12/(R10+R12) is input to an inverting input terminal of an operational amplifier via a low-pass filter composed of a resistor R11 and a capacitor C7, an amplifying factor of the operational amplifier is A=R14/R13+1. Meanwhile, an output of the operational amplifier is configured to control a base of a triode Q1 to operate in a linear amplifying area, feedback of the operational amplifier is connected to a collector of a triode Q; a change of a collector voltage is directly fed back to an in-phase input terminal of the operational amplifier when sampled, the larger the triode Q is turned on, the lower a feedback terminal voltage is, thus forming negative feedback. A feedback signal and an input signal are configured to control a base of the transistor Q to change an internal resistance of the transistor Q and change the collector voltage, thus remaining the collector voltage unchanged, so as to achieve a PWM signal with a given duty ratio and to output a 0-10V signal with a corresponding proportion.

The above is only the preferred embodiment of the present disclosure, and is not intended to limit the patent scope of the present disclosure. Any equivalent structural transformation made by using the description and attached drawings of the present disclosure or direct/indirect application in other related technical fields under the concept of utility model of the present disclosure is included in the patent protection scope of the present disclosure.

What is claimed is:

1. A dimming control circuit compatible with emergency lighting, comprising:

a main control circuit, wherein the main control circuit comprises a CMS8S6990 chip, and a peripheral circuit of the CMS8S6990 chip;

a first port circuit, wherein an input terminal of the first port circuit is electrically connected to an external automatic dimming circuit, and an output terminal of the first port circuit is electrically connected to a corresponding input terminal of the main control circuit;

a second port circuit, wherein an input terminal of the second port circuit is electrically connected to an external emergency power supply, and a corresponding output terminal of the second port circuit is electrically connected to a corresponding input terminal of the main control circuit; and a lighting port circuit, wherein a corresponding input terminal of the lighting port circuit is electrically connected to a corresponding output terminal of the main control circuit, and an output terminal of the lighting port circuit is connected to an external lamp;

when the first port circuit identifies that the automatic dimming circuit inputs a (pulse width modulation) PWM signal or a 0-10 V signal and the second port circuit identifies that an emergency power supply signal is input, the main control circuit is configured to identify the PWM signal and the emergency power supply signal, respectively, preferably the emergency power supply signal; when identifying that the emergency power supply signal is a non-emergency power supply signal, the main control circuit is configured to perform input capture on the PWM signal to acquire an amplitude, a duty ratio and a cycle, to collect an effective voltage of the 0-10 V signal, and to output information to the lighting port circuit after recovery calculation; and the lighting port circuit is configured to output a voltage signal to control brightness of the lamp.

2. The dimming control circuit compatible with emergency lighting according to claim 1, wherein the first port circuit comprises a port (D1), a resistor (R6), a resistor (R7), and a capacitor (C4); a first terminal of the port (D1) is connected to a 12 V direct current (DC) voltage, a second terminal of the port (D1) is connected to one terminal of the resistor (R6), the other terminal of the resistor (R6) is connected to one terminal of the resistor (R7) and one terminal of the capacitor (C4), respectively, and connected to a corresponding input terminal of the CMS8S6990 chip; the other terminal of the resistor (R7) and the other terminal of the capacitor (C4) are grounded, and are connected to a third terminal of the port (D1); and the first terminal, the second terminal and the third terminal of the port (D1) are also connected to the external automatic dimming circuit.

3. The dimming control circuit compatible with emergency lighting according to claim 1, wherein the second port circuit comprises a port (D3), a resistor (R9), a resistor (R8), and a capacitor (C6); a first terminal (D3-D4-DIM+) of the port (D3) is connected to a corresponding analog-to-digital (ADC) input terminal of the CMS8S6990 chip via one terminal of the resistor (R9), one terminal of the resistor (R8) and one terminal of the capacitor (C6), a second terminal (D3-D4-DIM−) of the port (D3) is connected to the other terminal of the resistor (R9) and the other terminal of the capacitor and is grounded; and the first terminal (D3-D4DIM+) and the second terminal (D3-D4DIM−) of the port (D3) are both emergency power supply dimming wires and are connected to the external emergency power supply.

4. The dimming control circuit compatible with emergency lighting according to claim 1, wherein the lighting port circuit comprises a resistor (R10), a resistor (R12), a resistor (R11), a capacitor (C7), and an proportional amplifier circuit; one terminal of the resistor (R10) is connected to a corresponding output terminal of the CMS8S6990 chip, the other terminal of the resistor (R10) is connected to one terminal of the resistor (R12) and one terminal of the resistor (R11), respectively; the resistor (R11) is connected to one terminal of the capacitor (C7) and is further connected to an input terminal of the proportional amplifier circuit, the other terminal of the resistor (R12) and the other terminal of the capacitor (C7) are both grounded, and an output terminal of the proportional amplifier circuit is connected to a lamp.

5. The dimming control circuit compatible with emergency lighting according to claim 2, wherein the proportional amplifier circuit comprises an operational amplifier, a capacitor (C8), a resistor (R13), a resistor (R14), a resistor (R15), a capacitor (C9), a resistor (R18), a capacitor (C10), a resistor (R17), a resistor (R16), and a triode (Q1); an inverting input terminal of the operational amplifier is connected to one terminal of the resistor (R11), an in-phase terminal of the operational amplifier is connected to an inverting terminal via the capacitor (C8), an output terminal of the operational amplifier is configured for output via the resistor (R18), an inverting terminal of the operational amplifier is connected to one terminal of the resistor (R18) via the resistor (R15) and the capacitor (C9), and is connected to a base of the triode (Q1); the in-phase terminal of the operational amplifier is also connected to one terminal of the resistor (R13) and is respectively connected to one terminal of the resistor (R16) and one terminal of the resistor (R17) via the resistor (R14), and is connected to a collector of the triode (Q1); the collector of the triode (Q1) is also connected to a control terminal of the lamp, and an emitter of the triode (Q1) is grounded; the other terminal of the resistor (R13) is grounded, the other terminal of the resistor (R16) is connected to the 12 V DC, and the other terminal of the resistor (R17) is connected to one terminal of the resistor (R18) via the capacitor (C10).

6. The dimming control circuit compatible with emergency lighting according to claim 1, wherein the dimming control circuit further comprises a power adjustment circuit; the power adjustment circuit comprises a dual in-line package (DIP) switch, a resistor (R2), a resistor (R3), a resistor (R4), and a resistor (R5); one terminal of the resistor (R2), one terminal of the resistor (R3), one terminal of the resistor (R4) and one terminal of the resistor (R5) are connected to corresponding output terminals of the DIP switch, respectively; the other terminal of the resistor (R2), the other terminal of the resistor (R3), the other terminal of the resistor (R4) and the other terminal of the resistor (R5) are connected to corresponding input terminals of the CMS8S6990 chip, respectively, and input terminals of the DIP switch are all grounded;

wherein the power adjustment circuit further comprises a slide rheostat (R1) and a capacitor (C3); a first terminal of the rheostat (R1) is connected to the 12 V DC, a second terminal of the slide rheostat (R1) is grounded, a third terminal of the slide rheostat (R1) is connected to a corresponding input terminal of the CMS8S6990 chip, and the capacitor (C3) is connected between the third terminal and the second terminal of the slide rheostat (R1) in parallel.

7. A method for the dimming control circuit compatible with emergency lighting according to claim 6, comprising the following steps:

when reading that an automatic dimming circuit inputs a non-PWM signal, dividing, by a first port circuit, a voltage via a resistor (R6) and a resistor (R7), and filtering the divided voltage via the resistor (R7) and a capacitor (C4), and then outputting the filtered voltage to a CMS8S6990 chip, reading, by an ADC terminal of the CMS8S6990 chip, a change of an analog voltage and converting the change of the analog voltage into a digital signal, recording, by the CMS8S6990 chip, the read voltage digital signal as DIV, multiplying DIV by n through internal calculation to amplify the DIV by n times, thus restoring the DIV to an original signal;

when an input of each of a first terminal (D3-D4-DIM+) and a second terminal (D3-D4-DIM−) of a second port circuit is an input of an analog voltage of 0-10 V or a particular code value is input to the CMS8S6990 chip, determining, by the CMS8S6990 chip, a mode after decoding the input, if the mode is a non-emergency mode, dividing the analog voltage of 0-10 V via a resistor (R9) and a resistor (R8), and filtering the divided voltage by the resistor (R8) and a capacitor (C6) to obtain an analog voltage signal of 0-5 V or 0-3.3 V, reading, by the ADC of the CMS8S6990 chip, a real-time voltage, and calculating an original signal voltage, and setting the original signal voltage to be D3V;

achieving, by a power adjustment circuit, n-th power of 2 adjustments of the maximum power in a non-emergency state through a DIP switch, setting a general purpose input/output (GPIO) port of the CMS8S6990 chip to be 0 V or a voltage common collector (VCC) through the DIP switch, so as to achieve the identification of 0 and 1, obtaining a plurality of gears through a binary combination of multi-bit 0 and 1, or achieving the maximum power adjustment through a slide rheostat (R1), and reading, by the CMS8S6990 chip, a proportion in real time through a level and the ADC, and setting the proportion to be P; and monitoring, by the CMS8S6990 chip, data of each port circuit in real time, multiplying a parameter of a port voltage of the first port circuit by P to obtain D1V*P=D5V, thus ensuring that a lamp is able to normally output correct brightness in the non-emergency mode, wherein D5V is an output terminal voltage of a lighting port circuit to the lamp.

8. The method for the dimming control circuit compatible with emergency lighting according to claim 7, wherein when the CMS8S6990 chip determines that the mode is an emergency mode after decoding, a D3V voltage is input by the CMS8S6990 chip to an input terminal of the lighting port circuit, that is, D5V=D3V.

9. The method for the dimming control circuit compatible with emergency lighting according to claim 8, wherein when the input terminal of the lighting port circuit receives a voltage that D1V*P=D5V or D5V=D3V, the voltage is divided via a resistor (R10) and a resistor (R12) to obtain a voltage equal to PWM high-level voltage*R12/(R10+R12), then the voltage equal to PWM high-level voltage*R12/(R10+R12) is input to an inverting input terminal of an operational amplifier via a low-pass filter composed of a resistor (R11) and a capacitor (C7), an amplifying factor of the operational amplifier is A=R14/R13+1; meanwhile, an output of the operational amplifier is configured to control a base of a triode (Q1) to operate in a linear amplifying area, a feedback of the operational amplifier is connected to a collector of a triode (Q); a change of a collector voltage is directly fed back to an in-phase input terminal of the operational amplifier when sampled, the larger the triode (Q) is turned on, the lower a feedback terminal voltage is, thus forming a negative feedback; a feedback signal and an input signal are configured to control a base of the triode (Q) to change an internal resistance of the triode (Q) and change the collector voltage, thus remaining the collector voltage unchanged, so as to achieve a PWM signal with a given duty ratio and to output a 0-10 V signal with a corresponding proportion.

* * * * *